(12) United States Patent
Silva et al.

(10) Patent No.: US 11,636,487 B2
(45) Date of Patent: Apr. 25, 2023

(54) GRAPH DECOMPOSITION FOR FRAUDULENT TRANSACTION ANALYSIS

(71) Applicant: Feedzai—Consultadoria e Inovação Tecnológica, S.A., Coimbra (PT)

(72) Inventors: Maria Inês Silva, Lisbon (PT); David Oliveira Aparício, Oporto (PT); Pedro Gustavo Santos Rodrigues Bizarro, Lisbon (PT); João Tiago Barriga Negra Ascensão, Lisbon (PT); Rodolfo Cristóvão, Lisbon (PT); Miguel Ramos de Araújo, Oporto (PT); Maria Beatriz Malveiro Jorge, Lisbon (PT); Mariana Rodrigues Lourenço, Lisbon (PT); Sandro Daniel Sabudin Nunes, Lisbon (PT)

(73) Assignee: Feedzai—Consultadoria e Inovação Tecnológica, S.A.

( * ) Notice: Subject to any disclaimer, the term of this patent is extended or adjusted under 35 U.S.C. 154(b) by 43 days.

(21) Appl. No.: 17/070,814

(22) Filed: Oct. 14, 2020

(65) Prior Publication Data
US 2021/0117978 A1    Apr. 22, 2021

Related U.S. Application Data

(60) Provisional application No. 62/923,314, filed on Oct. 18, 2019.

(51) Int. Cl.
*G06Q 20/40* (2012.01)
*G06F 9/54* (2006.01)
*G06F 16/901* (2019.01)

(52) U.S. Cl.
CPC ......... *G06Q 20/4016* (2013.01); *G06F 9/546* (2013.01); *G06F 16/9024* (2019.01)

(58) Field of Classification Search
CPC .. G06Q 20/4016; G06F 9/546; G06F 16/9024; G06F 21/55
See application file for complete search history.

(56) References Cited

U.S. PATENT DOCUMENTS

| | | | |
|---|---|---|---|
| 2011/0078189 A1* | 3/2011 | Bonchi | G06F 16/258 707/776 |
| 2014/0289076 A1 | 9/2014 | Jebara | |

(Continued)

OTHER PUBLICATIONS

Bahmani et al., Fast Incremental and Personalized Pagerank Proceedings of the VLDB Endowment, 4(3):173-184, 2010.

(Continued)

*Primary Examiner* — Sonji N Johnson
(74) *Attorney, Agent, or Firm* — Van Pelt, Yi & James LLP

(57) ABSTRACT

In an embodiment, a process for graph decomposition includes initializing nodes and edges of a data graph for analysis using a computer, and performing message passing between at least a portion of the nodes of the data graph to determine a corresponding measure of interest for each node of at least a portion of the data graph. The process further includes receiving an identification of one or more nodes of interest in the data graph, performing message passing between at least a portion of the nodes of the data graph using at least the determined measures of interest to identify a corresponding subgraph of interest for each of the one or more nodes of interest in the data graph, and performing an analysis action using the one or more identified subgraphs of interest.

21 Claims, 13 Drawing Sheets

(56) References Cited

U.S. PATENT DOCUMENTS

| | | |
|---|---|---|
| 2016/0253232 A1 | 9/2016 | Puri |
| 2017/0053009 A1 | 2/2017 | Bonchi |
| 2017/0221240 A1* | 8/2017 | Stetson ................ G06T 11/206 |
| 2017/0228448 A1* | 8/2017 | Fan ........................ G06Q 50/01 |
| 2017/0279822 A1* | 9/2017 | Lord ................... H04L 63/1408 |
| 2018/0137155 A1 | 5/2018 | Majumdar |
| 2020/0160121 A1* | 5/2020 | Parasrampuria ..... G06K 9/6276 |

OTHER PUBLICATIONS

Andersen et al., Local Graph Partitioning Using Pagerank Vectors, In 2006 47th Annual IEEE Symposium on Foundations of Computer Science (FOCS'06), pp. 475-486, 2006.

Cover et al., Nearest Neighbor Pattern Classification, IEEE Transactions on Information Theory, 13(1):Jan. 21-27, 1967.

Fu et al., Local Motif Clustering on Time-Evolving Graphs, In Proceedings of the 26th ACM SIGKDD International Conference on Knowledge Discovery Data Mining, KDD '20, p. 390-400, New York, NY, USA, Aug. 23-27, 2020, Association for Computing Machinery.

Page et al., The Pagerank Citation Ranking: Bringing Order to the Web, 1998.

Spielman et al., A Local Clustering Algorithm for Massive Graphs and its Application to Nearly Linear Time Graph Partitioning, SIAM Journal on Computing, 42(1):1-26, Jan. 2013.

Tsitsulin et al., Netlsd: Hearing the Shape of a Graph, In Proceedings of the 24th ACM SIGKDD International Conference on Knowledge Discovery & Data Mining, pp. 2347-2356. ACM, 2018.

Yin et al., Local Higher-Order Graph Clustering, In Proceedings of the 23rd ACM SIGKDD International Conference an Knowledge Discovery and Data Mining, KDD '17, p. 555-564, New York, NY, USA, 2017, Association for Computing Machinery.

Zhou et al., Motif-Preserving Dynamic Local Graph Cut, In 2018 IEEE International Conference on Big Data (Big Data), pp. 1156-1161, 2018.

* cited by examiner

Alerts  Cases  Rules  Data Science  Reports  Insights  Genome  Risk Ledger  👤 User 1 (OP) ▼

← Event #455676 – Mr. Adam Wizinsky                    All Queues ▼    New Alert →

Possible Breach Detected

Score  System Decision  Status  Reasons  Listed Entities
400    N/A              N/A     None     1 Entity ▶

Whitebox Explanations
● Unusually high transaction amount for card
  Average transaction amount for card is £34
● Merchant is risky
○
● Low transaction amount immediately followed by high
  transaction amount
●
●

| Report & Set Fraud (recommended) | ☒ Fraud | ☑ Not Fraud |

Queue    Analyst  Cases
N/A      N/A      None

Fraud Genome                                    ↙ 1010

[graph diagram]

Last 48H | All
All (10)   Card (3)    Customer (1)    Merchant (7)

Transaction
Date/Time            Amount
2018-02-06 14:03:22  £700.00
Lifecycle ID         Currency
481                  GBP
Transaction Status   Card ID
Approved             10755320
Transaction Type     Transaction Sub-Type
Authorized           N/A

Graph Explanations
Score: high risk

Recent transaction at Merchant A
with reported fraud in the last 24H

Merchant in the graph with an
abnormal increase in transactions
in the last 48H

Similar Genometries

[three small graph thumbnails]

BREACH       ATO          BOT ATTACK
80%          20%          50%
Similarity   Similarity   Similarity

FIG. 10B

GRAPH DECOMPOSITION FOR FRAUDULENT TRANSACTION ANALYSIS

CROSS REFERENCE TO OTHER APPLICATIONS

This application claims priority to U.S. Provisional Patent Application No. 62/923,314 entitled GRAPH DECOMPOSITION FOR FRAUDULENT TRANSACTION ANALYSIS filed Oct. 18, 2019 which is incorporated herein by reference for all purposes.

BACKGROUND OF THE INVENTION

Graphs are useful for visualizing and analyzing data, and can help navigate large data sets. For example, graphs can be used to visualize accounts and transactions for detecting security attacks and fraud. However, building manageable graphs with relevant context for analysis is challenging because conventional graph building techniques do not efficiently or effectively find relevant subgraphs within a graph.

BRIEF DESCRIPTION OF THE DRAWINGS

Various embodiments of the invention are disclosed in the following detailed description and the accompanying drawings.

FIG. 10B shows an example of a graphical user interface for displaying subgraphs within a case manager tool.

DETAILED DESCRIPTION

Figure 1:
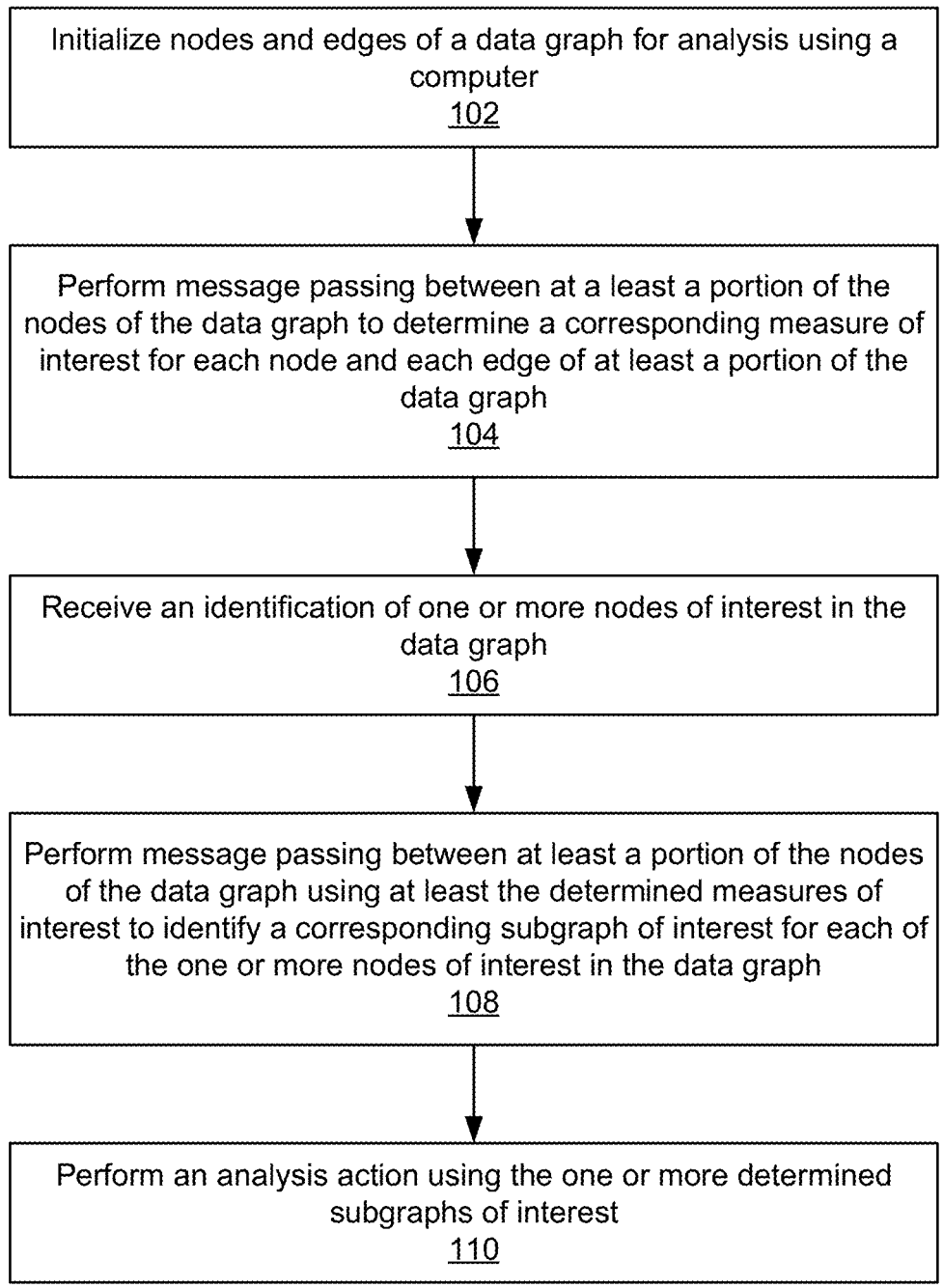
FIG. 1 is a flowchart illustrating an embodiment of a process for graph decomposition.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Graph decomposition techniques are disclosed. The disclosed techniques determine and output relevant context (e.g., subgraphs) in graphs. In various embodiments, the disclosed techniques identify meaningful subgraphs within a graph (including those graphs/networks that are very large and connected) by decomposing the graph into subgraphs. The relevant context determined by the disclosed techniques helps fraud analysts to boost their decision accuracy and speed. State-of-the-art fraud detection systems for retail banking are mostly automated. Typically, a machine learning (ML) model evaluates if transactions are fraudulent or legitimate. In most cases, the ML model's decision results in an action, e.g., to accept or to reject the transaction. However, if the ML model's confidence is low, those cases are escalated to fraud analysts, who review the transaction and decide whether the transaction is fraudulent or legitimate.

For example, in the case of fraud detection, when reviewing a potential fraud case (either a single transaction or a set of transactions), fraud analysts analyze the details of the suspicious case itself and its context (e.g., past transactions of the client, other clients that used the same card or address in past purchases). Thus, a fraud analyst's speed and accuracy can be improved by providing the fraud analyst with tools that gather relevant fraud detection context.

Choosing the right context to show in a graph/network can be challenging. One option is to show the most immediate context such as transactions that share a direct connection to the particular transaction under review. This may represent other transactions of the same client or transactions made with the same card. However, indirect connections can also be interesting, e.g., if a client v under review used the same device as another client u which was involved in a past fraudulent transaction, including u in the graph visualization of v might be helpful, even though v and u were never directly involved in a transaction.

Another challenge for representing certain types of data (e.g., retail banking data) as a graph is that highly connected networks are typically difficult to decipher. For these types of data, expanding a node in the graph by just a few hops will reveal the entire network and therefore might not be helpful for analysts. In other words, these expansions include unnecessary context that might undermine the analysis. For example, many clients are directly connected to big merchants or tax authorities. If graph expansion is performed blindly through these nodes, the size of the expansion quickly explodes. Those nodes that are directly connected to a large portion of the network are referred to as super-nodes.

The disclosed techniques find application in a variety of data analysis and visualization situations, including Genome by Feedzai, a graph visualization tool that models entities involved in a transaction (e.g., clients, cards) as nodes and their relations as edges (e.g., a client uses a certain card). In the graph visualization tool, the connections between entities can help fraud analysts to review potential fraud cases and identify new fraudulent patterns.

In one aspect, an expansion algorithm extracts relevant context (i.e., a subgraph) from highly connected networks (such as banking networks), based on user-defined interest functions. The resulting subgraphs can be used to provide visual context to fraud analysts via a graph visualization tool (such as Genome by Feedzai), among other things. In another aspect, the expansion algorithm includes a message-passing algorithm that efficiently computes expansions. The message-passing algorithm propagates interest across a network and obtains the final subgraphs (such as GenomeUnits by Feedzai). In various embodiments, the disclosed graph decomposition techniques perform expansion in parallel so that it can easily scale to large networks. Subgraphs produced by the disclosed techniques have many beneficial properties including being small enough for a fraud analyst to easily or quickly understand and containing relevant context to help a fraud analyst to make a decision.

The terms "graph," "data graph" and "network" are used interchangeably herein. The terms "graph decomposition" and "graph expansion" are used interchangeably herein and refer to extracting relevant context from a graph. The relevant context/portion of the graph is referred to as a "subgraph".

FIG. 1 is a flowchart illustrating an embodiment of a process for graph decomposition. The process can be performed by a graph decomposition engine 900 shown in FIG. 9 or by a processor shown in FIG. 11. The process receives as input one or more of the following:

an initial graph G (e.g., an initial transaction network)
a list of seed nodes S⊆V (G)
function(s) defining node interest
function(s) defining edge interest number of iterations h to perform (e.g., number of interest propagation hops). This parameter controls how many hops away two nodes can be in order for them to influence each other with their interest. For instance, in a connected graph, the effect of setting h to be the diameter of the graph (h=diameter (G)) is that all nodes influence every other node in proportion to their distance. This parameter gives a user the flexibility to control interest propagation (how long-reaching) corresponding to 104 of FIG. 1. Alternatively, the number of iterations performed can be based on convergence, stopping when nodes' interest is stable across consecutive iterations.

Interest threshold k. This parameter controls the seed expansion process (when to stop) corresponding to 108 of FIG. 1. The process uses k as a relative value to the seed. For instance, if k=0.8, the process will ignore expansions that are 20% less interesting than the seed's initial interest.

Interest aggregation function γ. This function specifies how a node combines its interest from the previous iteration with the interest received from its neighbors in the current iteration as further described below.

Decay function θ. This function specifies the weight decay of a node's interest relative to its distance to the seed as further described below.

As further described below, the process performs neighborhood expansion based on node and/or edge interest. Given a set of entities (e.g., clients, cards) under review (one or more seeds), the process decomposes the graph to extract a subgraph of the original transaction network for each seed. The process starts from one or more seeds of interest and iteratively finds the seeds' best expansions based on user-defined criteria. The user sets the interest criteria through interest functions that receive information about the transaction graph's nodes and edges and provide a score for each node and edge.

The process begins by initializing nodes and edges of a data graph for analysis using a computer (102). The data graph can be for performing computer-assisted data analysis such as fraudulent transaction detection. The process initializes the graph using interest functions to assign an interest score to each node and each edge in the graph. In various embodiments, the interest functions are user-defined. For example, the user can select from among several suggested interest functions provided by a system. As another example, custom interest functions can be created by or on behalf of the user.

The interest of a node or edge defines the worthiness/likelihood of expanding that node or edge. Node interest depends on a variety of factors, some examples of which are:

Node types. In a heterogeneous network, some node types are more interesting than others. For instance, in some situations, a first node type (an IP address) is less important than a second node type (a card) since IP addresses are noisier. An IP address may be a weak identifier since it can be used by multiple people, e.g., in a coffee shop. Thus, an example interest function assigns lower interest to nodes of type "IP address" than to nodes of type "card".

Past labels. For example, nodes that have been previously flagged as interesting (e.g., fraudulent) are of higher interest than nodes that have not been previously flagged as such.

Activity. Some nodes have seen little activity (e.g., a client stopped using the merchant/bank) and thus are of lower interest than a recently active node in various embodiments.

Topological features. Some nodes with high/low values for certain graph measures might be more interesting, e.g., high/low degree, high/low clustering coefficient. For example, nodes with high centrality (e.g., betweenness centrality) might be more interesting since they connect different parts of the graph and thus including them in the expansion makes traversal to different regions of the graph quicker.

Edge interest depends on a variety of factors, some examples of which are:

Past labels. For example, edges that have been previously flagged as interesting (e.g., a fraudulent transaction involving two people) are of higher interest than edges that have not been previously flagged as such.

Edge weight. In a weighted graph, the weight indicates interest in various embodiments. For instance, if edges represent transaction amounts, higher edge weights might be more interesting.

Activity. Some edges are more recent than others, and thus might be more or less interesting.

Relation to the nodes. Some edges are more interesting in relation to the involved nodes. For instance, if a node typically has nodes of a certain type/weight, and this edge has a different type/weight, it might be more interesting than the similar edges.

These examples are not intended to be limiting and the factors (or other factors) can be captured by a user-defined function. In various embodiments, interest functions output interest scores between 0 and 1, with 0 being least interesting and 1 being most interesting or vice versa. The scores can be appended to the graph to build a new weighted graph or used as a separate data-structure (e.g., a dictionary mapping nodes/edges to their interest). After initialization, every node and edge of graph G contains their own interest score.

The process performs message passing between at least a portion of the nodes of the data graph to determine a corresponding measure of interest for each node of at least a portion of the data graph (104). The process propagates interest by having one or more nodes pass (send) a message containing their node interest to their neighbor nodes. Message passing propagates interest across the data graph, resulting in a propagated interest score (measure of interest) for each node in the data graph. The message passing can be performed in parallel meaning that more than one node can pass messages to other nodes at the same time, which reduces processing time.

Referring to the information received at 102, interest propagation can be performed for h iterations and takes into account both the node's interest and the edge's interest. Nodes may split their node interest among their neighbors according to an interest neighbor division function ($\varphi$) and update their node interest according to an interest aggregation function ($\gamma$) as further described herein. The result of message passing is a new propagated interest score for each node.

The process receives an identification of one or more nodes of interest in the data graph (106). The identification may be made programmatically/automatically or by a user. For example, the identification is provided by a user such as a fraud analyst who is interested in a particular entity (e.g., account, device, IP address) as represented by a node of the graph. The selected node of interest is referred to as a "seed" or "seed node."

The process performs message passing between at least a portion of the nodes of the data graph using at least the determined measures of interest to identify a corresponding subgraph of interest for each of the one or more nodes of interest in the data graph (108). Like 106, message passing here also refers to passing messages from one node to one or more neighbor nodes. However, unlike 106 where every node in the graph passes messages, here only some of the nodes pass messages to other nodes. For example, in a first iteration, seeds (nodes identified in 106) pass messages to their neighbors and in subsequent iterations, those nodes that were updated in a previous iteration pass messages to their neighbors. Seed expansions are calculated using the measures of interest determined at 106 (propagated interest scores).

Referring to the information received at 102, the process runs the expansions for each seed $s \in S$. The seed expansion process runs on top of the graph G and the propagated node interest from 106. The expansion starts by computing the minimum interest for the seed using an interest threshold (k). In various embodiments, distant nodes from the seed are penalized according to a decay function ($\theta$). At the end of the seed expansion process, each node contains the expansions traversing them, starting from each seed. This information may be stored in G.

In various embodiments, the process yields seed expansions with the following properties:

Nodes in high-interest areas have more interest.

Nodes that connect to high-interest areas have more interest.

Direct neighbors of super-nodes have less interest.

Nodes closer to the seed have more interest.

In various embodiments, the process identifies a corresponding subgraph of interest by applying a map-reduce operation to the expansions to extract subgraphs, one for each seed in various embodiments.

The process performs an analysis action using the one or more determined subgraphs of interest (110). The analysis action can be context- or domain-specific. For example, the analysis action includes outputting the determined subgraphs of interest to a fraud analyst to help determine whether transaction(s) associated with the subgraphs are fraudulent. As another example, the analysis action includes combining subgraphs or otherwise further processing the subgraphs to generate information responsive to a user query. As yet another example, the analysis action includes outputting the subgraphs to a machine learning module or other computational module to improve the module's ability to classify data or otherwise detect patterns in data.

The graph decomposition process of FIG. 1 will now be explained using the example of FIG. 2.

Figure 2:
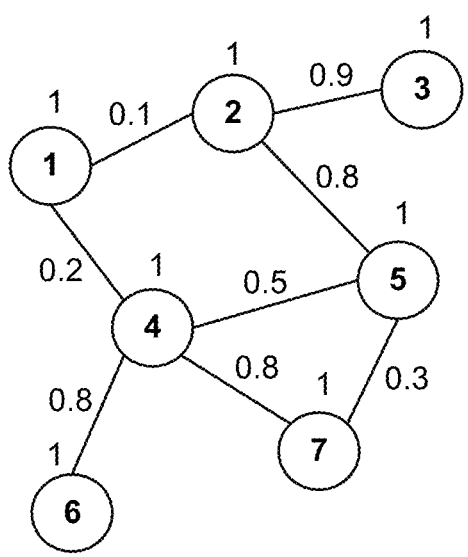
FIG. 2 shows an example of an initial graph.

FIG. 2 shows an example of an initial graph. The nodes of the graph are represented by the circles and the number inside the circle identifies the node. In this example, there are seven nodes assigned an identifier from 1 to 7. The edges of the graph are the lines joining the circles, so Node 1 and Node 2 are connected by an edge, Node 1 and Node 4 are connected by an edge, etc.

Also shown in FIG. 2 are the interest values with which the graph is initialized. Each of the nodes have a node interest score of "1" to begin with, while the edge joining Node 1 and Node 2 has an edge interest score of "0.1," the edge joining Node 1 and Node 4 has an edge interest score of "0.2," etc. These scores are initialized using interest functions as further described herein. In this example the scoring system assigns a higher score to nodes/edges of higher interest and a lower score to nodes/edges of lower interest. Other scoring scales or schema are possible (e.g., a lower score means higher interest).

The graph shown here can be represented by a variety of data structures such as an adjacency matrix or as an adjacency list. The following figures describe some of the steps of the process of FIG. 1 in greater detail.

Figure 3:
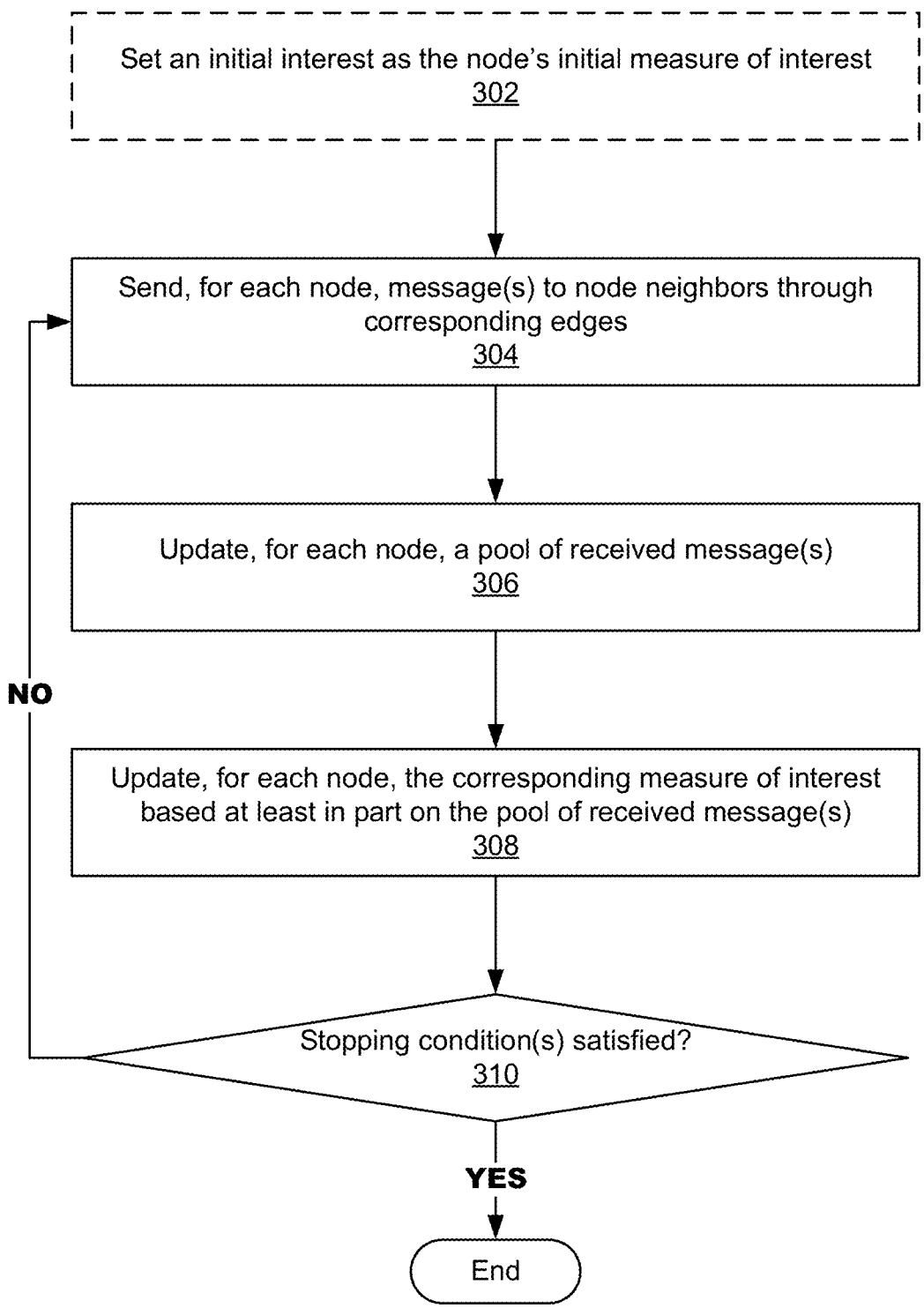
FIG. 3 is a flowchart illustrating an embodiment of a process for interest propagation.

FIG. 3 is a flowchart illustrating an embodiment of a process for interest propagation. The process can be performed as part of another process such as 104 of FIG. 1. The process of FIG. 3 can be performed periodically, such as every few days. The process can be performed by a graph decomposition engine 900 shown in FIG. 9 or by a processor 1102 shown in FIG. 11.

Interest propagation includes performing message passing between at least a portion of the nodes of the data graph to determine a corresponding measure of interest for each node of at least a portion of the data graph. In various embodiments, the interest propagation process takes as input one or more of the following: a graph G (such as the graph of FIG. 2), calculated initial interests $I_V$ and $I_E$, parameters (which may be user-defined) iterations h, interest neighbor division function $\varphi$, and interest aggregation function $\gamma$, to determine the propagated interest $I_V^h$. The process of FIG. 3 will be explained using the example shown in the FIGS. 4A to 4F, which is based on the initial graph of FIG. 2. FIGS. 4A to 4F show examples of a graph with interest scores.

Figure 4A:
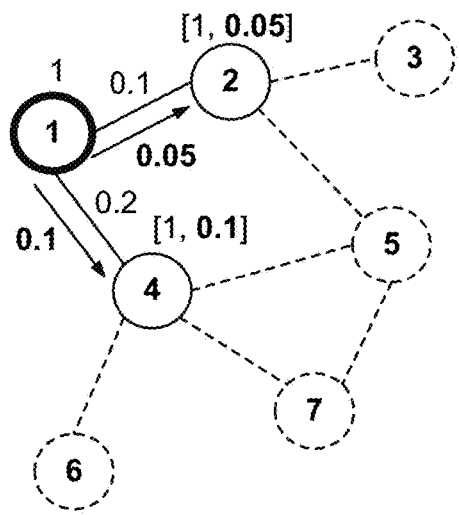
FIG. 4A shows an example of a graph corresponding to a first iteration of interest propagation.

Returning to FIG. 3, the process begins by setting an initial interest $I_V^0$ equal to the node's initial measure of interest $I_V$ (302). In various embodiments, this corresponds to initializing at 102 of FIG. 1. Referring briefly to FIG. 4A, which shows interest propagation for Node 1, the initial interest of the node, which is $I_V=1$ in this example based on FIG. 2.

The process sends, for each node, one or more messages to node neighbors through corresponding edges (304). For simplicity, this is sometimes described as a node n sending a message to another node m. The process can send messages to neighbors for each/every node in the graph. A message contains the interest $i_{n,m}$, which is obtained using an interest neighbor division function $\varphi$. Equation 1 is an example of an interest neighbor division function.

$$\varphi(n, I_{n,m}) = \frac{I_n}{deg(n)} \times I_{n,m} \quad (1)$$

Equation 1 has the following properties that make it suitable for propagating interest:

The function is monotonically increasing on the nodes interest $I_n$, so nodes close to high-interest areas receive messages with high interest values from their neighbors and, therefore, have high propagated interests.

The function is monotonic increasing on the edge interest score $I_{n,m}$, so messages received via low-interest edges are penalized and vice-versa. Thus, a node connected to a high-interest area via a low-interest edge will have a lower propagated interest than a node connected to the same area via a high-interest edge.

The function contains the node degree deg(n) (which is the number of connections it has to other nodes in the graph) in the denominator, so neighbors of super-nodes will receive (increasingly) lower interest from the super-node. Hence, direct neighbors of super-nodes will have lower propagated interest scores.

Equation 1 is merely exemplary and not intended to be limiting. Other functions that meet the three properties above may also be used as the interest neighbor division function. For example, $I_{n,m}$ in Equation 1 can be replaced by a node's associated edge weight ($I_{n,m}$) divided by the weighted degree of node n: $\Sigma I_{n,v}, \forall(n, v) \in E(G)$.

Referring to FIG. 4A, Node 1 sends a message to each of its neighbors, Node 2 and Node 4. The message (0.05) to Node 2 is obtained by Equation 1, where the current node interest $I_n=1$, the degree deg (n)=2, and the edge interest $I_{n,m}=0.1$. Alternatively, as described above, $I_{n,m}$ in Equation 1 can be replaced by the edge weight (0.1) divided by total edge weights (0.3). The message (0.1) to Node 4 is obtained by Equation 1, where the current node interest $I_n=1$, the degree deg (n)=2, and the edge interest $I_{n,m}=0.2$. The other nodes also send messages to each of its neighbors. For example, referring to FIG. 4B, Node 7 sends a message to each of its neighbors, Node 4 and Node 5. Using Equation 1, the message to Node 4 is 0.4 and the message to Node 5 is 0.15.

The process can track messages for a node using a data structure (e.g., a list) $N_n$. At each iteration, each node's set of received messages, $N_n$, is initialized as empty. When nodes send messages to their neighbors through their edges, $N_n$ gets updated with the messages. Returning to FIG. 3, the process updates, for a node, a pool of received one or more messages (306). After a node m receives a message from neighbor n, the process updates its pool of received messages to contain $i_{n,m}$. Like 304, this is sometimes described as a node updating its pool of messages. The process can update the pools for each/every node in the graph.

Figure 4B:
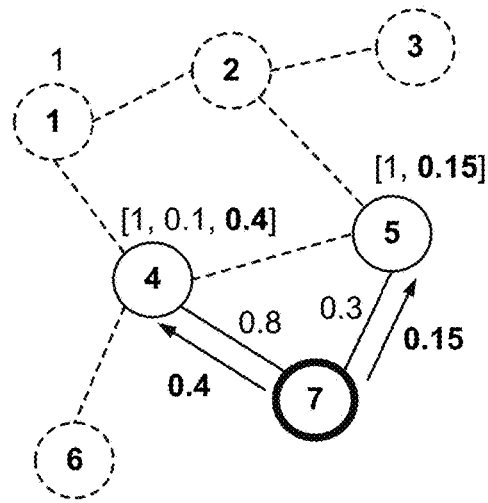
FIG. 4B shows an example of a graph corresponding to a first iteration of interest propagation.
Figure 4C:
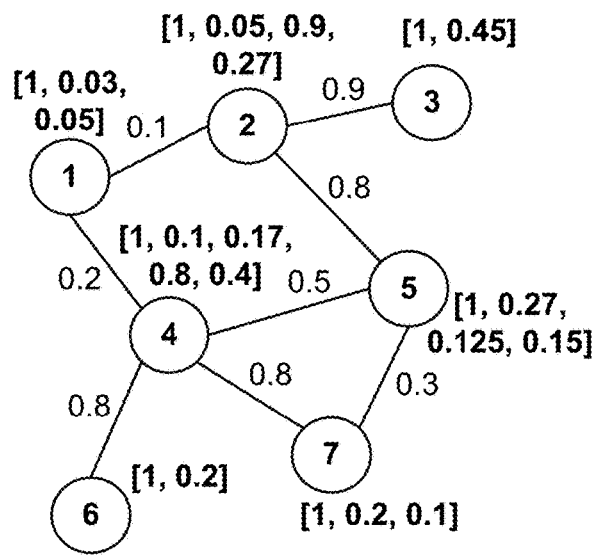
FIG. 4C shows an example of a graph corresponding to a first iteration of interest propagation.

Referring to FIG. 4A, after receiving the message (0.05) from Node 1, Node 2 updates its pool of messages to contain 0.05, i.e., [1, 0.05] where 1 is the original node interest score. Similarly, Node 4 updates its pool of received messages to contain the message 0.1 as shown. Referring to FIG. 4B, after receiving the message (0.4) from Node 7, Node 4 updates its pool of messages to [1, 0.1, 0.4]. After message passing is completed for all nodes, the graph looks like FIG. 4C. As shown, each of the nodes has a pool of messages received from other nodes.

Returning to FIG. 3, the process updates, for a node, the corresponding measure of interest based at least in part on the pool of received one or more messages (308). An interest aggregation function, which may be user-defined, can take into account the received messages to update the node's measure of interest (sometimes called a "node interest"). Like 304, this is sometimes described as a node updating its interest score (measure of interest). The process can update the node interest for each/every node in the graph. After all messages for a current iteration have been exchanged, each node updates its node interest using a function $\gamma$, which can be user-defined. Equation 2 shows an example of a user-defined interest function.

$$\gamma(I_n^{h-1}, N_n) = \text{average}(\text{concat}(N_n, I_n^{h-1})) \quad (2)$$

$\gamma$ gives equal weight to the previous node interest $I_n^{h-1}$ and to each of the neighbors' interests contained in list $N_n$. Equation 2 is merely exemplary and not intended to be limiting. Other functions may also be used to meet other user goals. For example, other functions might give more/less weight to $I_n^{h-1}$ and/or use different aggregators (e.g., max, min) rather than or in addition to the averaging aggregator in this example. As another example, sometimes when combined, $\varphi$ and $\gamma$ may result in progressively lower interest values. If this is undesirable for a user (e.g., for very low values, rounding errors might be too significant), alternatives include using a γ function that does not have this property, or performing an extra step of scaling after each iteration (e.g., min-max scaling between 0 and 1 of the nodes interest $I_V^h$).

Figure 4D:
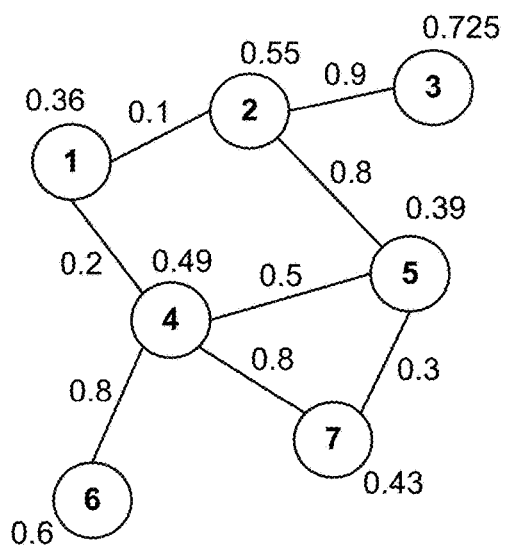
FIG. 4D shows an example of a graph corresponding to a first iteration of interest propagation.

Referring to FIG. 4D, the updated node interest of node 1 is 0.36 because the average of the previous node interest $I_n^{h-1}=1$ and the pool of received messages (neighbors' interests are 0.03 and 0.05) is 0.36. Each of the nodes can be updated in a similar way resulting in the graph of FIG. 4D as shown.

The process determines whether one or more stopping conditions are satisfied (310). If the stopping conditions are satisfied, the process ends. Otherwise, the process returns to 304. In other words, 304-308 can be repeated for a desired number of iterations so that the process propagates interest for as long as a user or system desires. In various embodiments, the stopping condition includes the number of hops h defined by a user.

Figure 4F:
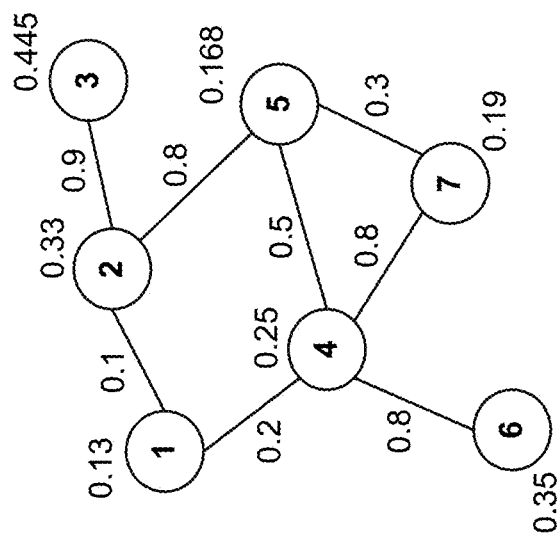
FIG. 4F shows an example of a graph with interest scores corresponding to a second iteration of interest propagation.
Figure 4E:
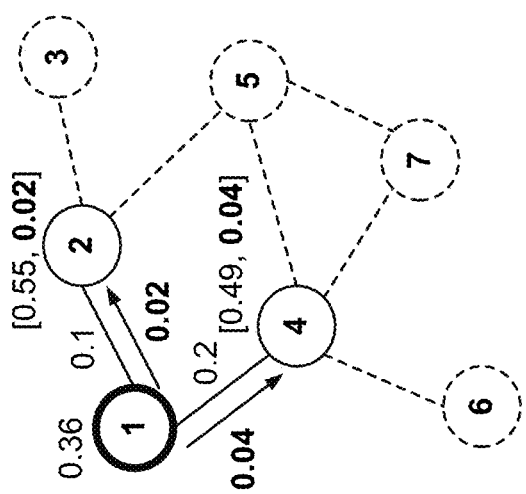
FIG. 4E shows an example of a graph corresponding to a second iteration of interest propagation.

FIGS. 4A-4D show examples of a graph corresponding to a first iteration of interest propagation. Iterations can be repeated until a stopping condition such as a user-specified number of hops h is met. FIGS. 4E and 4F show examples of a graph corresponding to a second iteration of interest propagation. In FIG. 4E, the Node 1 sends a message to each of its neighbors, Node 2 and Node 4. The message (0.02) to Node 2 is obtained by Equation 1, where the current node interest $I_n=0.36$, the degree deg(n)=2, and the edge interest $I_{n,m}=0.1$. Equation 1 yields 0.018, which is rounded to 0.02. Rounding, if any, or the number of rounding digits can be predetermined or set by a user. Referring now to Node 2, the received message is added to the pool including the current node interest [0.55, 0.02]. Message passing is performed for all nodes, and the updated node interest scores are shown in FIG. 4F.

Figure 5:
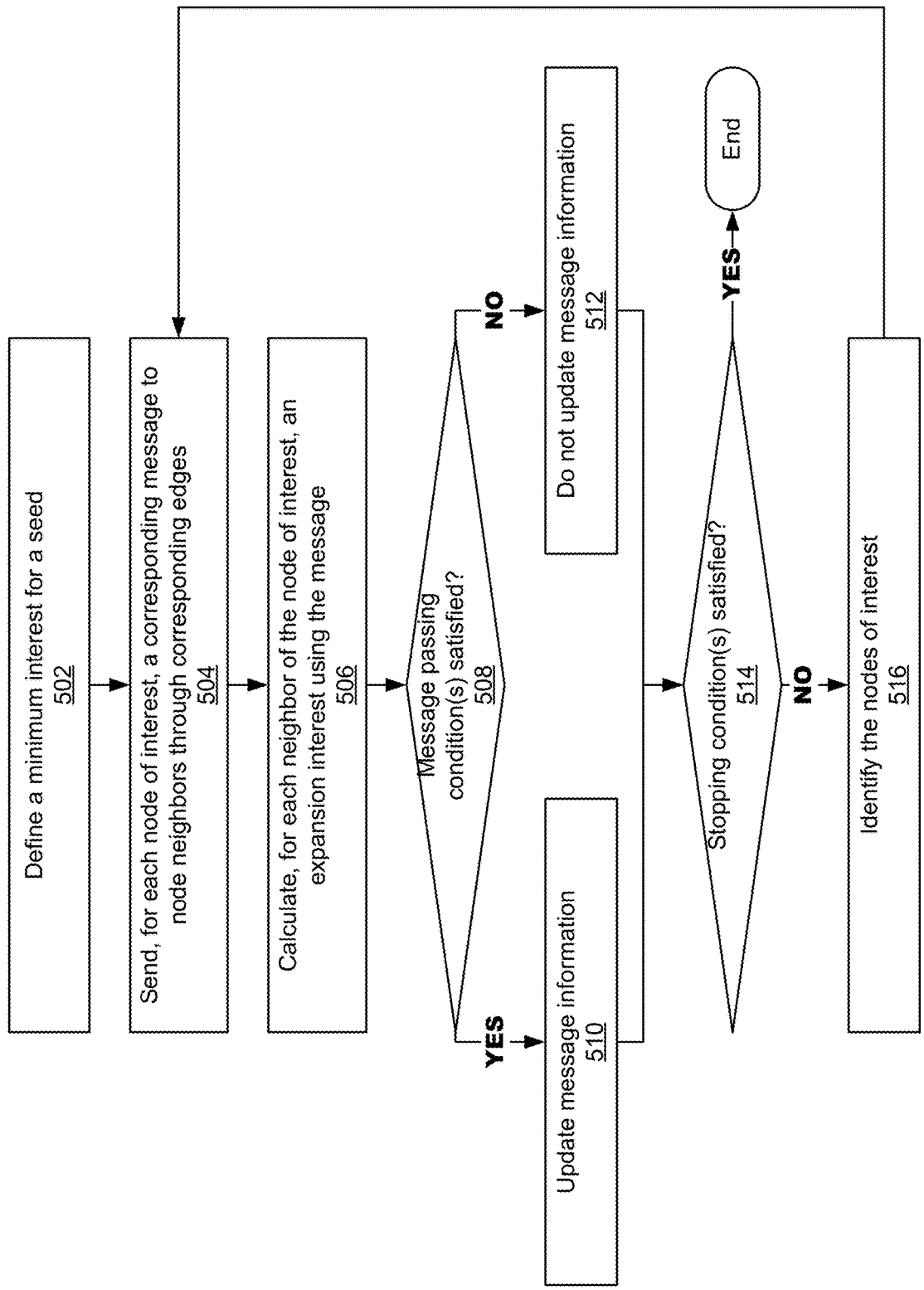
FIG. 5 is a flowchart illustrating an embodiment of a process for seed expansion.

FIG. 5 is a flowchart illustrating an embodiment of a process for seed expansion. The process can be performed as part of another process such as 108 of FIG. 1. Seed expansion includes performing message passing between at least a portion of the nodes (those nodes updated in the previous iteration, or, in the case of the first iteration, the seed nodes) using determined measures of interest (from the process of FIG. 3) to identify a corresponding subgraph of interest for each of the one or more nodes of interest in a data graph. The process can be performed by a graph decomposition engine 900 shown in FIG. 9 or by a processor shown in FIG. 11.

In various embodiments, the seed expansion process takes as input one or more of the following: a graph G, propagated node interest $I_V^h$ (for all the nodes in the graph), a list of seed nodes S, decay function θ, or interest threshold k to obtain a list of expansions traversing each node n ∈ V(G) starting from one of the seeds s ∈ S.

The process of FIG. 5 will be explained using the example shown in FIGS. 6A-6G. FIGS. 6A-6G show examples of a graph corresponding to seed expansion. The input to the seed expansion process is a graph in a state after interest propagation such as the graph of FIG. 4F.

The process begins by defining a minimum interest for a seed (502). Seeds are those nodes that were identified to be of interest at 106 in various embodiments. In addition, the process may initialize variables that keep track of nodes and expansions. For example, a set of updated nodes U starts as an empty set. List(s) of expansions traversing each node are also set to empty. In various embodiments, the process initializes a path L with the single seed s. As further described below, during expansion, the process creates an expansion, adds that expansion to the list of all expansions going through s, and adds s to the set of updated nodes U.

A minimum interest t for a seed can be defined as a fixed threshold or can be based on the seed interest $I_s^h$ and interest expansion toleration parameters k. For example, the minimum interest t can be given by $t=I_s^h*k$, meaning the interest score of the seed node scaled by the expansion toleration parameter k. In various embodiments, an edge case k=1 is handled by permitting expansions to only go to nodes at least as interesting as s, and if k=0 all expansions are allowed.

Figure 6B:
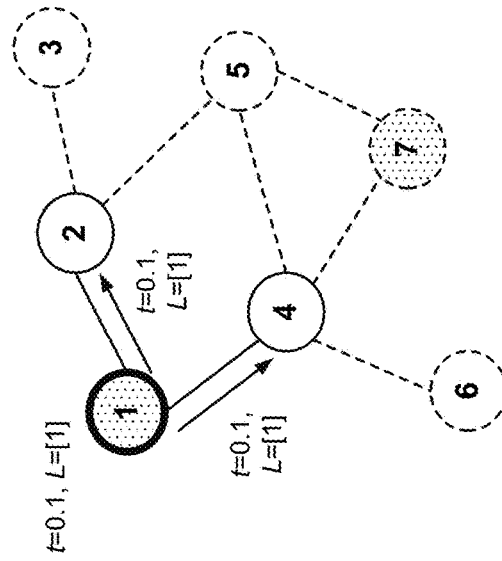
FIG. 6B shows an example of a graph corresponding to seed expansion.
Figure 6C:
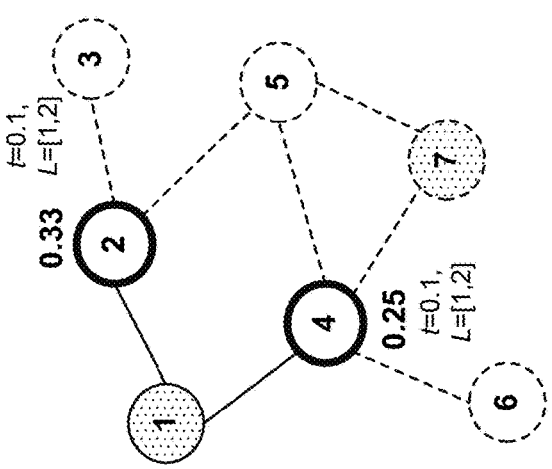
FIG. 6C shows an example of a graph corresponding to seed expansion.
Figure 6A:
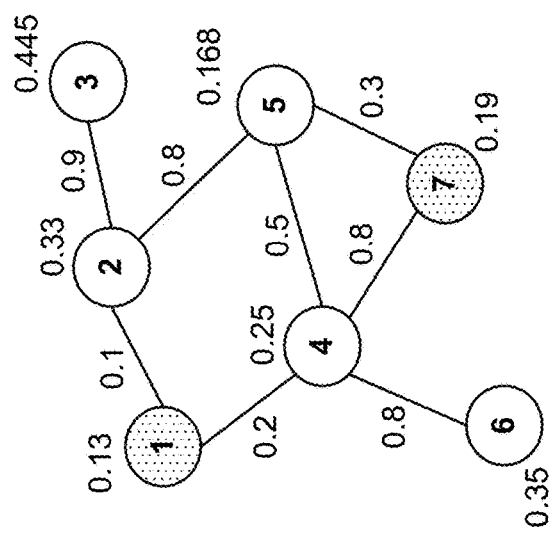
FIG. 6A shows an example of a graph corresponding to seed expansion.

Referring to FIG. 6A, the seeds selected for expansion are Node 1 and Node 7. The selection may be made by a user such as a fraud analyst, and the seed expansion process may be performed on demand. The initial node interest scores and edge interest scores shown here are the same as the ones in FIG. 4F, which is a state of the graph after interest propagation has been performed. For example, Seed Node 1 has a node interest score=0.13. For each seed, a seed expansion process can be performed to obtain its expansion, i.e., to obtain a subgraph.

Referring to FIG. 6B, suppose the process is initialized with k=0.8. Seed Node 1 is expanded by calculating its minimum interest score, which is t=0.1 (after rounding), given by the node interest score*k=0.8*0.13. At this point, Seed Node 1 has a path L=[1] because this is the origin seed.

Returning to FIG. 5, the process sends, for each node of interest, a corresponding message to node neighbors through corresponding edges (504). In a first iteration, the nodes of interest are the seeds, so the process sends, for each seed, a message to each of the seed's neighbors. As further described below, in later iterations, the nodes of interest are those nodes that received a valid message in the previous iteration to its neighbors, so the process sends a message to neighbors of those nodes. The message contains the minimum interest score of the seed and the list of its expansions, which is a list of nodes through which the expansion is made (path traversed so far). The message can be passed to neighbors through the edges.

Referring to FIG. 6B, Seed Node 1 has two neighbors: Node 2 and Node 4, so Seed Node 1 passes a message containing its minimum interest m=0.1 and path L=[1] to these neighbors as shown.

Returning to FIG. 5, the process calculates, for each neighbor of the (each) node of interest, an expansion interest using the message (506). The process checks nodes that received updates at 504 by calculating the expansion interest for those nodes. The expansion interest can be used to determine whether to continue expanding in the direction of the neighbor. The expansion interest is given by the interest of the neighbor $I_n^h$, scaled by a decay function θ.

Parameter θ specifies the interest decay as a function of the length of the current expansion. θ is used to define how close an expansion stays to a seed. Equations 3 and 4 show examples of θ.

$$\theta_1(L)=|L|^{-1} \quad (3)$$

$$\theta_2(L)=e^{1-51|L|} \quad (4)$$

Equations 3 and 4 assign more interest to nodes closer to a seed since they progressively decrease the interest of more distant nodes. $\theta_2$ decreases more rapidly than $\theta_1$, which might be more or less adequate depending on the type of desired expansions. For example, if expansions closer to a seed are desired, $\theta_1$ or a θ' that decreases less quickly is used. Conversely, if expansions farther from a seed are desired, $\theta_2$ or a θ" that decreases more quickly is used. Equations 3 and 4 are merely exemplary and not intended to be limiting. A user can define the interest decay function or other parameter associated with the stopping condition.

Referring to FIG. 6C, assume in this example, the decay function used is Equation 3, so $\theta_1$ is given by $1/|L|$, meaning nodes of path length 1 have $\theta_1=1$, nodes of path length 2 have $\theta_1=0.5$, nodes of path length 3 have $\theta_1=0.33$, and so on. At this point, Node 2 and Node 4 are a path of length=1 away from Seed Node 1 so $\theta_1=1$. Referring to FIG. 6A, the node interest of Node 2 is 0.33 and the Node interest of Node 4 is 0.25.

Node 2 and Node 4 receive updates from Seed Node 1, so their expansion interests are calculated as follows. The expansion interest of Node 2 is 0.33 (given by 1*0.33) and the expansion interest of Node 4 is 0.25 (given by 1*0.25).

Returning to FIG. 5, the process determines whether one or more message passing conditions are satisfied (508). For example, the message passing condition is the expansion interest being above the minimum interest. An expansion interest that is lower than the minimum interest indicates that the process should stop expanding in that direction (along that path) since there are no more interesting nodes to expand towards. In other words, there are no more valid extensions through the current path. An extension to a path is valid if the expansion has enough interest and if the neighbor is not already on it.

If the message passing condition is not satisfied (e.g., an expansion interest is below the minimum interest), then the process does not update message information (512) and proceeds to determine whether stopping condition(s) are satisfied (514). Otherwise, the process updates message information (510). For example, the message information is updated by the current node creating a new expansion containing (i) the minimum interest allowed by the seed and (ii) the updated path containing the path traversed so far including the current node. If the expansion was already found in previous iterations, it is discarded. If the expansion is new, the expansion is added to the list of traversed paths and the current node is added to the list of nodes that have been updated U' in the current iteration. At the end of each iteration, the list of nodes to be explored is updated and, if the list is not empty, the process continues by returning to 504.

Referring to FIG. 6C, the minimum interest is t=0.1 (obtained from the message from Seed Node 1), the expansion interest of Node 2 is 0.33, and the expansion interest of Node 4 is 0.25. The expansion interest of Node 2 exceeds the minimum interest (t=0.1), so the message passing condition is satisfied. The expansion interest of Node 4 exceeds the minimum interest (t=0.1), so the message passing condition is also satisfied here. Thus the message information can be updated for Node 2 and Node 4.

Figure 6D:
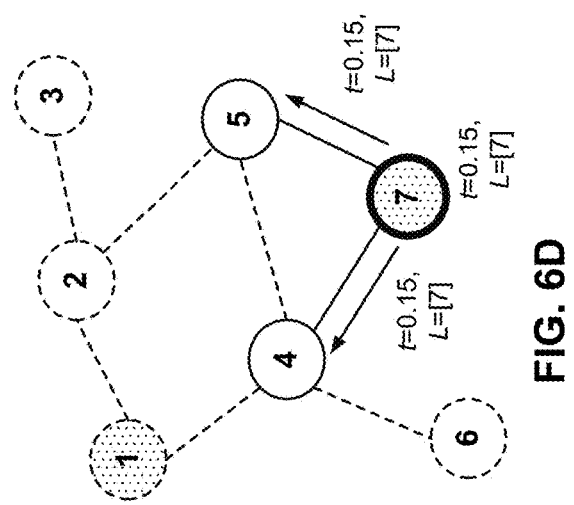
FIG. 6D shows an example of a graph corresponding to seed expansion.
Figure 6E:
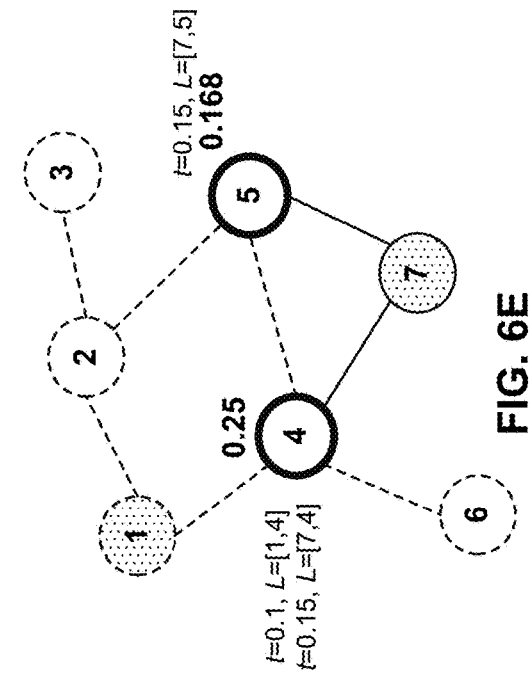
FIG. 6E shows an example of a graph corresponding to seed expansion.

Seed expansion (including message passing) can be performed in parallel. FIGS. 6D and 6E show an expansion starting from Seed Node 7, which can take place at substantially the same time as expanding Seed Node 1 (FIGS. 6A-6C). The same process is performed for Seed Node 7, and valid paths (satisfied message passing conditions) are found through Node 4 and Node 5. For example, Seed Node 7 is expanded by calculating its minimum interest score, which is t=0.15 (after rounding), given by the node interest score*k=0.8*0.19. In the first iteration, Seed Node 7 has a path L=[7] because this is the origin seed. Next, the process calculates the expansion score for Node 4, which is 0.25, given by 1*0.25; and the expansion score for Node 5, given by 1*0.168. In both cases, message passing conditions are satisfied, because they each exceed the minimum interest score, which is t=0.15.

Message information for Node 4 and Node 5 get updated as shown in FIG. 6E. Node 5 retains a message with the minimum interest scores from Seed Node 7 (t=0.15) and the path traversed to reach this node, which is L=[7,5]. Node retains a second message from Seed Node 7 (in addition to the first message from Seed Node 1). As shown, Node 4 previously received a message from Seed Node 1 (t=0.1, L=[1,4]) and another message from Seed Node 7 (t=0.15, L=[7,4]). That is, each node can retain multiple messages.

Returning to FIG. 5, the process determines whether one or more stopping conditions is satisfied (514). In this example, the stopping condition is to stop expanding after the process can no longer find an expansion with an interest higher than the seed's minimum interest, indicating that there are no more interesting nodes to expand towards. In other words, the process stops when no new paths are added. Other conditions are possible, such as stopping after k iterations (similar to the interest propagation process of FIG. 3), stopping after some time, among other things. If the stopping condition is satisfied, the process ends. Otherwise, the process proceeds to identify the nodes of interest (516). The nodes of interest are those with valid extensions for which message passing is performed when the process returns to 504. These nodes of interest are the ones in a next iteration whose node neighbors get messages. In other words, the process identifies a second set of node(s) of interest (which may or may not overlap with the earlier identified nodes of interest). The process then sends a corresponding message (with updated message information) neighbors of the second set of node(s) of interest through corresponding edges.

Figure 6F:
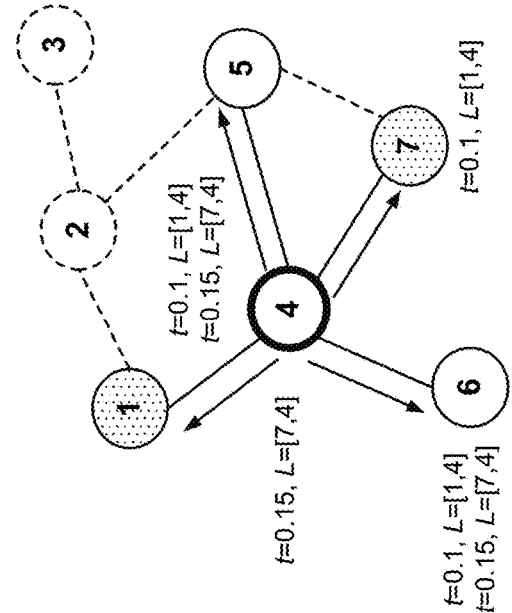
FIG. 6F shows an example of a graph corresponding to seed expansion.

Referring now to FIG. 6E, expansion continues from only those nodes that updated their state, namely Nodes 2, 4, and 5. For simplicity, the expansions of 2 and 5 are not shown. Taking Node 4 for example, FIG. 6F shows expansion from Node 4 to its neighbors Nodes 1, 5, 6, and 7.

Figure 6G:
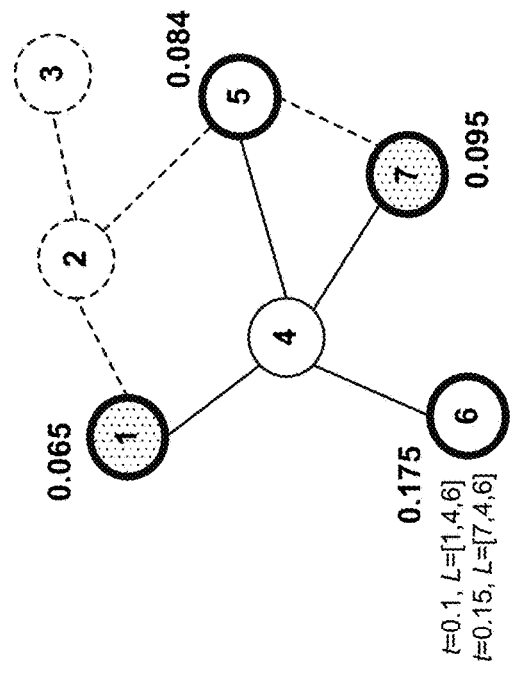
FIG. 6G shows an example of a graph corresponding to seed expansion.

FIG. 6G shows the expansion interest scores for each of Nodes 1, 5, 6, and 7. The scores for Nodes 1, 5, and 7 are lower than the minimum interest score, so extensions from those nodes are invalid and those nodes are not further expanded. The expansion interest score for Node 6 is 0.175, which is greater than t=0.1 and t=0.15, so expansion through this node is valid. In the next iteration, Node 6 gets expanded, while the other ones are not. For simplicity, the remainder of the expansions are not shown. After several iterations, eventually no more valid extensions exist and the process ends.

Figure 7:
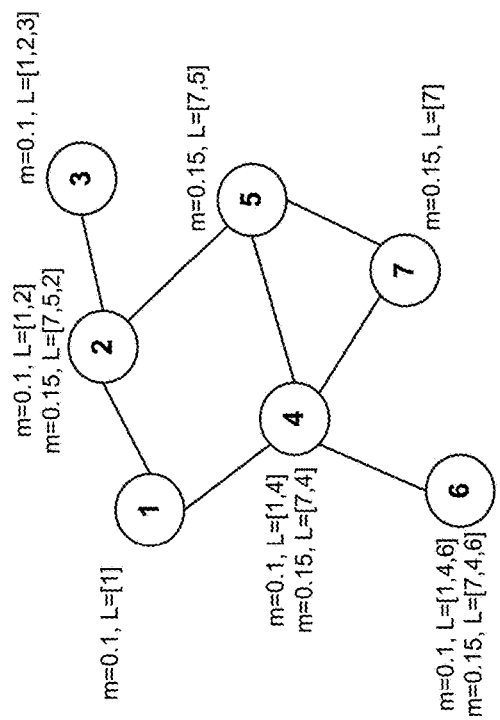
FIG. 7 shows a state of an example graph after seed expansion.

FIG. 7 shows a state of an example graph after seed expansion. This graph is obtained by expanding from Seed Node 1 and Seed Node 7. Each node has one or more associated minimum interests and one or more lists of expansions.

The list of expansions for each node is used to obtain subgraphs as follows.

Figure 8:
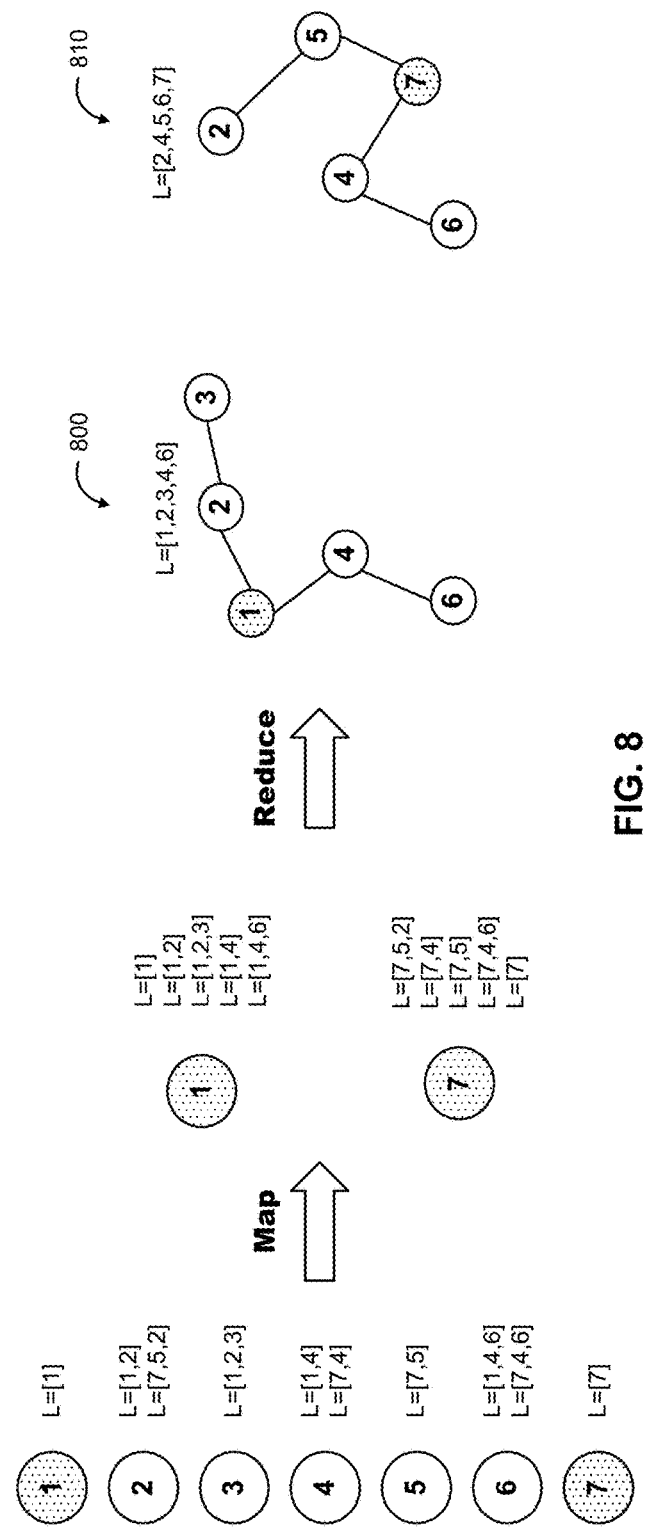
FIG. 8 shows an example of subgraphs obtained in some embodiments.

FIG. 8 shows an example of subgraphs obtained in some embodiments. Here, two subgraphs 800 and 810 are obtained from a list of expansions by performing a map-reduce operation. Mappers traverse the lists of expansions and, for each one of them, obtain their path L and seed s, and emit the seed-expansion pair. Thus, at the end of the mapping process, all pairs of seed-expansion are produced as shown. Finally, for each seed s, a reduce operator combines the resulting paths and obtains the subgraph. Here, each Seed Node 1 and Seed Node 7 has its own subgraph given by its path.

Figure 9:
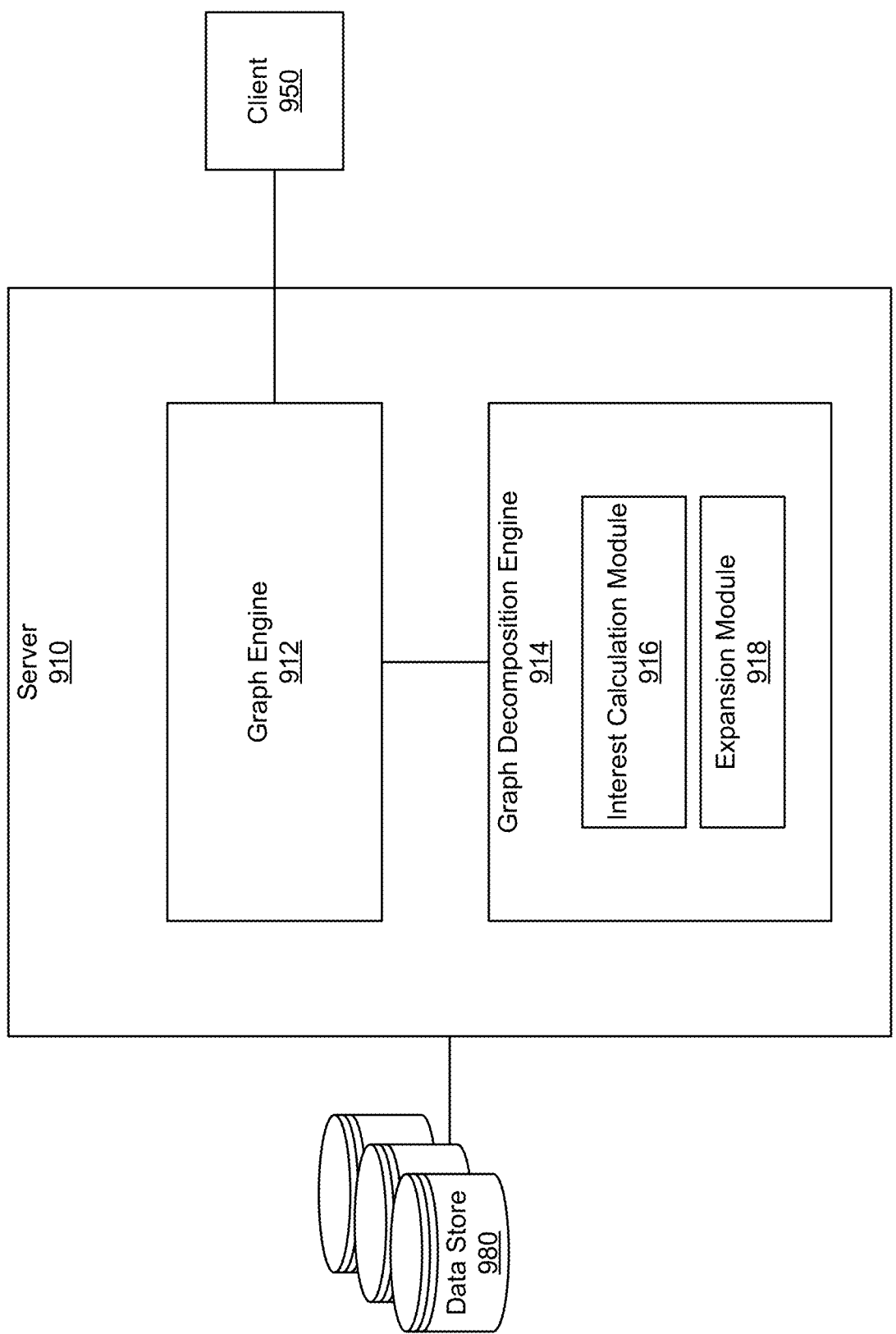
FIG. 9 is a block diagram illustrating an embodiment of a system for graph decomposition.

FIG. 9 is a block diagram illustrating an embodiment of a system for graph decomposition. The system includes a server 910, a client 950, and data store 980.

Data store 980 is configured to store data such as transactional data to be analyzed by server 910 and/or client 950. The data may be associated with a third party such as a government agency, merchant, bank, etc. Data from the data store can be visualized using a graph visualization tool of the server 910. Data store 980 may include one or more data storage devices, and third party data may be stored across the one or more data storage devices.

Server 910 may include one or more processors or nodes in a clustered computing system. The server may be configured for various applications such as a fraud detection system that processes data (including streaming data) from data store 980 to detect fraud. Server 910 includes a graph engine 912 and graph decomposition engine 914.

Figure 10A:
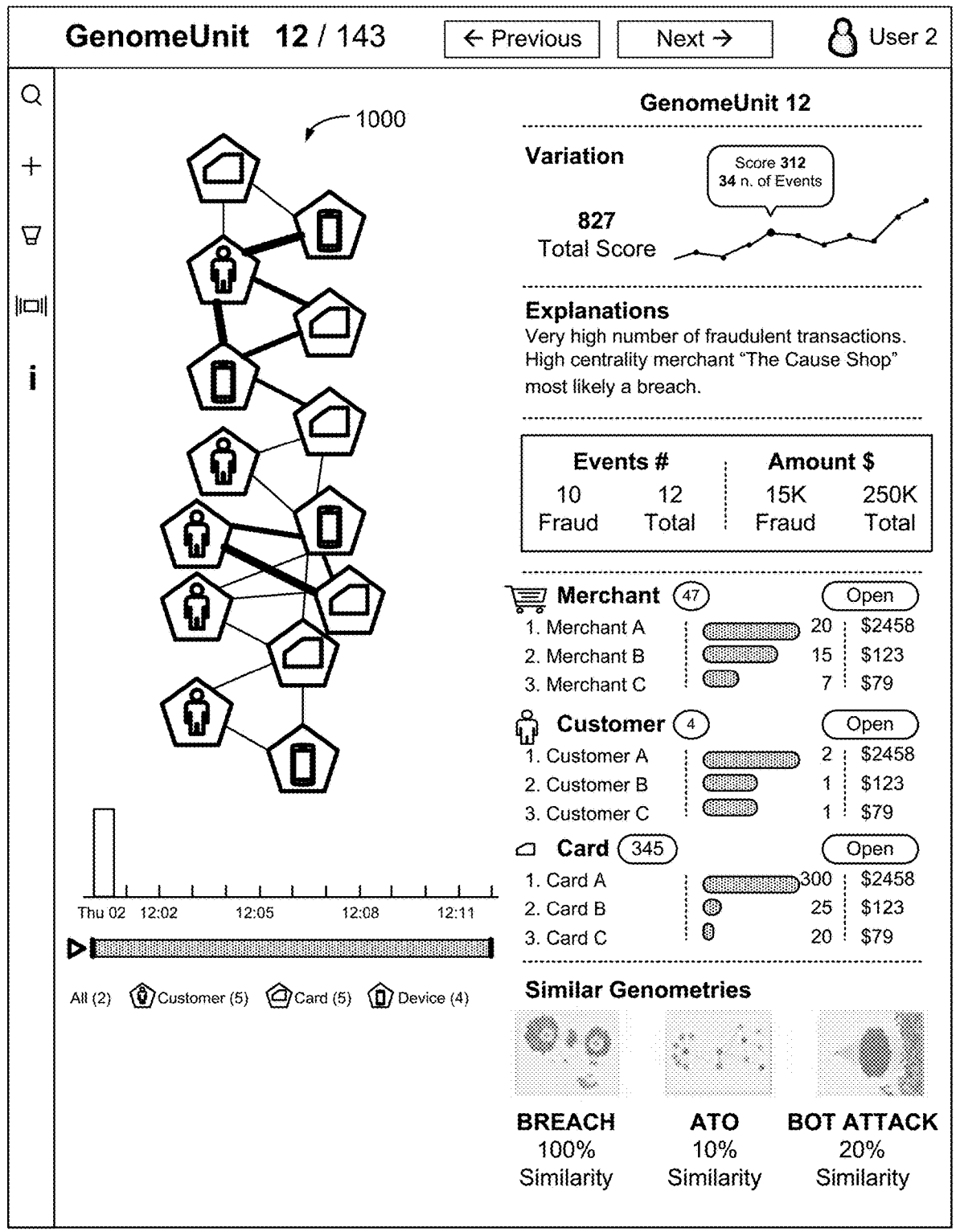
FIG. 10A shows an example of a graphical user interface for displaying subgraphs within a graph visualization tool.

Graph engine 912 is configured to visualize data in a graph by converting transactions to a graph, vectorizing the graph, identifying vectors as fraud, and comparing subsequent transactions to patterns to help identify fraud. An example of a graph generated by graph engine 912 is shown in FIG. 2 and FIGS. 10A and 10B.

Graph decomposition engine 914 is configured to perform the techniques disclosed herein, e.g., the processes of FIGS. 1, 3, and 5 to identify one or more subgraphs of interest for each of the one or more nodes of interest in a data graph. The graph decomposition engine includes an interest calculation module 916 and an expansion module 918. These modules are shown as separate logical/functional units but may be implemented by one or more processors.

Interest calculation module 916 is configured to perform the interest propagation process of FIG. 3 to determine interest scores of nodes and propagate the scores according to a user-defined function. Expansion module 918 is configured to perform the seed expansion process of FIG. 5 to perform expansions based on a user-selected seed node. The results of the processes performed by the interest calculation module and expansion module can be used by the graph decomposition engine 914 to identify subgraphs of interest within a data graph.

Client 950 is communicatively coupled to server 910 via a network. A user such as a fraud analyst may access the server or components within the server to perform a task such as fraud detection. For example, the user provides selection of a seed node via a user interface of the client.

In operation, client 950 access graph engine 912 to view a graph visualization of data from data store 980. While performing a task such as fraud detection, client 950 may wish to drill down on a particular section of a data graph provided by graph engine 912. Via a user interface, client 950 sends a selection of a seed node. The selection is passed by graph engine 912 to graph decomposition engine 914 and triggers the process of FIG. 5. Seed node 918 is used by the expansion module to perform seed expansion and identify subgraphs. The subgraphs are then displayed to the client 950 to assist in the fraud detection task. In the background (not necessarily at the command of a client), interest calculation module 916 may periodically (or as managed by graph engine 912 or an administrator) perform an interest propagation process such as the one shown in FIG. 3 so that when client 950 requests a subgraph the information used is relatively fresh.

FIG. 10A shows an example of a graphical user interface for displaying subgraphs within a graph visualization tool. This graphical user interface displays subgraph 1000, which is GenomeUnit 12 out of 143 total GenomeUnits. In this example, 143 subgraphs are obtained from a graph using the disclosed graph decomposition techniques. The user can navigate from one subgraph to another (e.g., GenomeUnit 1 to GenomeUnit 2, etc.) using the previous and next buttons displayed on the top menu. The menu on the left displays other navigational tools such as searching, adding data, displaying help, etc. Subgraph 1000 corresponds to data collected on Thursday from 12:00 to 12:12. Selecting the "play" triangle button causes the subgraph to change with time to correspond to the transactional data. In this case, the state of the subgraph corresponds to the data at 12:12. A legend for the subgraph node types and number of nodes of that type can be displayed as shown (all types, customer types, card type, and shipping type). The right side of the graphical user interface displays analysis associated with the subgraph GenomeUnit 12 such as variations, explanations for why some activity is suspicious, events and dollar amounts associated with the data in the current subgraph, node type details (merchant, customer, and card in this example), and similar patterns. The pattern in this subgraph highly matches a breach and has relatively low resemblance to an account takeover (ATO) and bot attack. The information displayed here may be helpful to User 2, an L2 analyst to make fraud determinations and analysis.

FIG. 10B shows an example of a graphical user interface for displaying subgraphs within a case manager tool. This graphical user interface displays subgraph 1010 (or GenomeUnit 1010). The subgraph corresponds to transaction data for a specifiable time period (last 48 hours here), but the user may select another time frame such as "all" time in this example. Other options may be provided via the user interface but are not shown here. The user interface includes menus (one at the top and one at the left) to help the user navigate the information and features of the case manager. The user can select between reporting, marking as fraud, and marking as not fraud using the buttons shown. The user interface also displays whitebox explanations, transaction details, graph explanations, and similar patterns (Genometries) associated with the subgraph 1010. The pattern in this subgraph highly matches a breach, has some resemblance to a bot attack, and has relatively low resemblance to an ATO. The information displayed here may be helpful to User 1, an L1 analyst to make fraud determinations and analysis.

In the sections where subgraph 1000 and subgraph 1010 are shown, other subgraphs or graphs may be displayed. For example, the user interface may initially show a full graph like the one in FIG. 2. A user may select one of more nodes of interest to be seeds, and in response, the process of FIG. 1 is performed to obtain the subgraphs of FIG. 8, which get displayed on the user interface. The user can navigate from one subgraph 800 to another subgraph 810 using the "previous" and "next" buttons of FIG. 10A for example.

Figure 11:
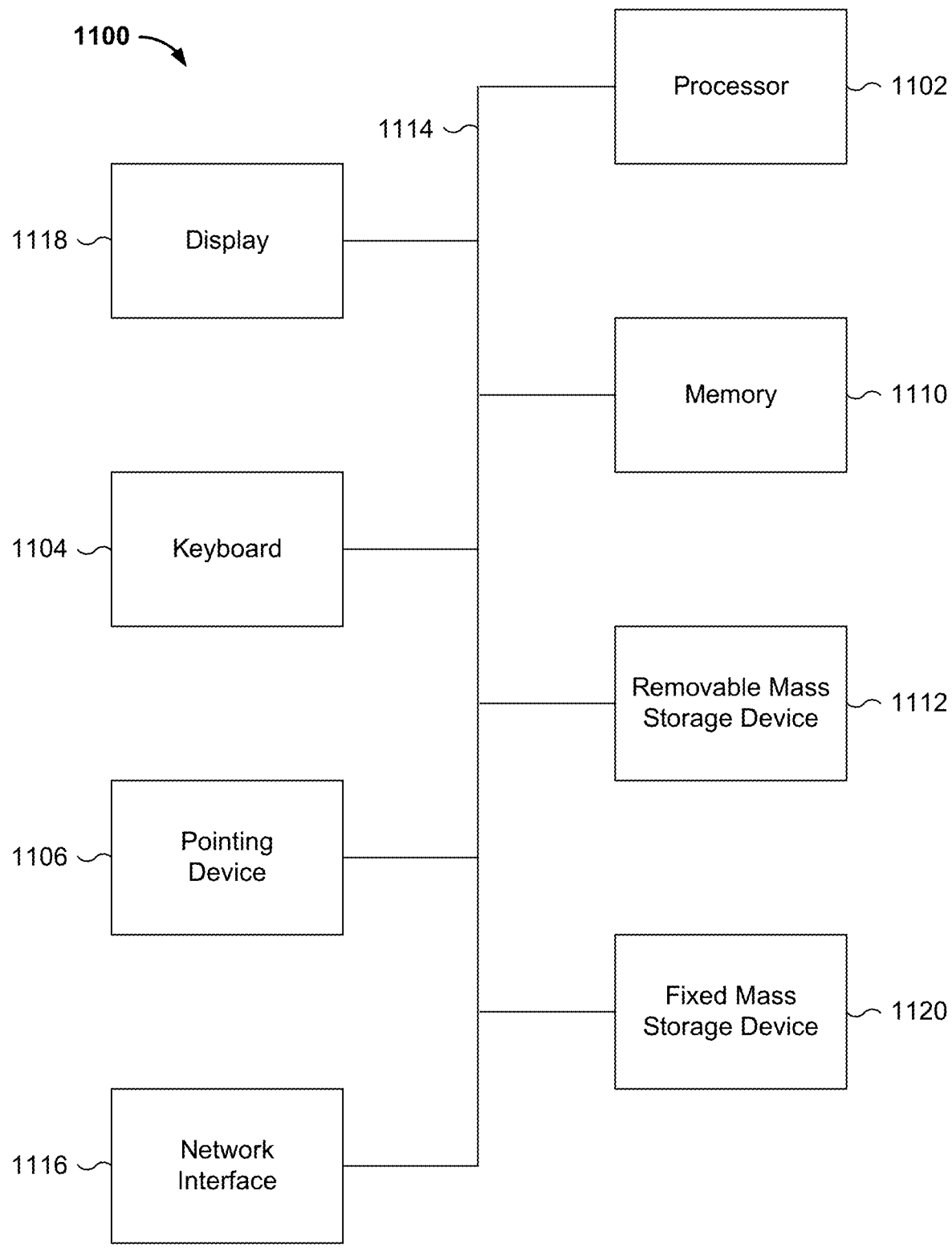
FIG. 11 is a functional diagram illustrating a programmed computer system for graph decomposition in accordance with some embodiments.

FIG. 11 is a functional diagram illustrating a programmed computer system for graph decomposition in accordance with some embodiments. Other computer system architectures and configurations can be used to perform the described graph decomposition technique. Computer system 1100, which includes various subsystems as described below, includes at least one microprocessor subsystem (also referred to as a processor or a central processing unit (CPU) 1102). For example, processor 1102 can be implemented by a single-chip processor or by multiple processors. In some embodiments, processor 1102 is a general purpose digital processor that controls the operation of the computer system 1100. In some embodiments, processor 1102 also includes one or more coprocessors or special purpose processors (e.g., a graphics processor, a network processor, etc.). Using instructions retrieved from memory 1110, processor 1102 controls the reception and manipulation of input data received on an input device (e.g., pointing device 1106, I/O device interface 1104), and the output and display of data on output devices (e.g., display 1118).

Processor 1102 is coupled bi-directionally with memory 1110, which can include, for example, one or more random access memories (RAM) and/or one or more read-only memories (ROM). As is well known in the art, memory 1110 can be used as a general storage area, a temporary (e.g., scratch pad) memory, and/or a cache memory. Memory 1110 can also be used to store input data and processed data, as well as to store programming instructions and data, in the form of data objects and text objects, in addition to other data and instructions for processes operating on processor 102. Also as is well known in the art, memory 1110 typically includes basic operating instructions, program code, data, and objects used by the processor 1102 to perform its functions (e.g., programmed instructions). For example, memory 1110 can include any suitable computer readable storage media described below, depending on whether, for example, data access needs to be bi-directional or uni-directional. For example, processor 1102 can also directly and very rapidly retrieve and store frequently needed data in a cache memory included in memory 1110.

A removable mass storage device 1112 provides additional data storage capacity for the computer system 1100, and is optionally coupled either bi-directionally (read/write) or uni-directionally (read only) to processor 1102. A fixed mass storage 1120 can also, for example, provide additional data storage capacity. For example, storage devices 1112 and/or 1120 can include computer readable media such as magnetic tape, flash memory, PC-CARDS, portable mass storage devices such as hard drives (e.g., magnetic, optical, or solid state drives), holographic storage devices, and other storage devices. Mass storages 1112 and/or 120 generally store additional programming instructions, data, and the like that typically are not in active use by the processor 1102. It will be appreciated that the information retained within mass storages 1112 and 1120 can be incorporated, if needed, in standard fashion as part of memory 1110 (e.g., RAM) as virtual memory.

In addition to providing processor 1102 access to storage subsystems, bus 1114 can be used to provide access to other subsystems and devices as well. As shown, these can include a display 1118, a network interface 1116, an input/output (I/O) device interface 1104, a pointing device 1106, as well as other subsystems and devices. For example, pointing device 1106 can include a camera, a scanner, etc.; I/O device interface 1104 can include a device interface for interacting with a touchscreen (e.g., a capacitive touch sensitive screen that supports gesture interpretation), a microphone, a sound card, a speaker, a keyboard, a pointing device (e.g., a mouse, a stylus, a human finger), a Global Positioning System (GPS) receiver, an accelerometer, and/or any other appropriate device interface for interacting with system 1100. Multiple I/O device interfaces can be used in conjunction with computer system 1100. The I/O device interface can include general and customized interfaces that allow the processor 1102 to send and, more typically, receive data from other devices such as keyboards, pointing devices, microphones, touchscreens, transducer card readers, tape readers, voice or handwriting recognizers, biometrics readers, cameras, portable mass storage devices, and other computers.

The network interface 1116 allows processor 1102 to be coupled to another computer, computer network, or telecommunications network using a network connection as shown. For example, through the network interface 1116, the processor 1102 can receive information (e.g., data objects or program instructions) from another network, or output information to another network in the course of performing method/process steps. Information, often represented as a sequence of instructions to be executed on a processor, can be received from and outputted to another network. An interface card or similar device and appropriate software implemented by (e.g., executed/performed on) processor 1102 can be used to connect the computer system 1100 to an external network and transfer data according to standard protocols. For example, various process embodiments disclosed herein can be executed on processor 1102, or can be performed across a network such as the Internet, intranet networks, or local area networks, in conjunction with a remote processor that shares a portion of the processing. Additional mass storage devices (not shown) can also be connected to processor 1102 through network interface 1116.

In addition, various embodiments disclosed herein further relate to computer storage products with a computer readable medium that includes program code for performing various computer-implemented operations. The computer readable medium includes any data storage device that can store data which can thereafter be read by a computer system. Examples of computer readable media include, but are not limited to: magnetic media such as disks and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code as produced, for example, by a compiler, or files containing higher level code (e.g., script) that can be executed using an interpreter.

The computer system shown in FIG. 11 is but an example of a computer system suitable for use with the various embodiments disclosed herein. Other computer systems suitable for such use can include additional or fewer subsystems. In some computer systems, subsystems can share components (e.g., for touchscreen-based devices such as smart phones, tablets, etc., I/O device interface 1104 and display 118 share the touch sensitive screen component, which both detects user inputs and displays outputs to the user). In addition, bus 1114 is illustrative of any interconnection scheme serving to link the subsystems. Other computer architectures having different configurations of subsystems can also be utilized.

The subgraphs and other information generated by the disclosed graph decomposition techniques are suitable for fraud analysts of various skill levels. For example, level 1 (L1) analysts review transactions and decide whether they are fraudulent or legitimate. Thus, one of their goals is to make quick and accurate decisions about individual transactions. Level 2 (L2) analysts look for major fraud trends and investigate big schemes. Thus, one of their goals is to analyze large sets of transactions and obtain insights that can be used to tune a fraud detection system (e.g., build new fraud detection rules, create new features for the ML model).

For L1 analysts, the disclosed graph decomposition techniques are applied to extract relevant context of the seed transaction. For example, the transaction under review is the seed of the expansion, and the process extracts a relevant subgraph around that seed. Then, this subgraph is shown to the analysts, which provides them with a visual context while reviewing the transaction that leads to a quicker and more accurate decision.

For L2 analysts, the disclosed graph decomposition techniques are applied to extract relevant context of a group of transactions. For example, all resulting transactions (from a query to a graph visualization tool) are seeds to be expanded, and the process returns the respective subgraphs. Then, these subgraphs are shown to the analysts and they can explore the visual representation, making information more digestible to them than when shown only the list of all transactions.

As described herein, the disclosed techniques extract relevant context around a seed node. In other words, given a node, the graph decomposition techniques return a subgraph around that node that contains its most pertinent connections.

The disclosed techniques are different from local graph clustering, whose goal is typically to identify a qualified local cluster near a given seed node. A local cluster is a group of nodes around a seed node with a high-connectivity within the cluster and low connectivity outside of the cluster. Connectivity is normally defined in terms of edge conductance.

Another conventional technique is motif conductance, which is typically used to encode high-order structures. Motif conductance expands the notion of edge conductance by aiming to conserve inside the clusters specific subgraph patterns, such as triangles, cycles, or stars. Conventional motif conductance is typically only applicable to a single subgraph, and thus does not work properly when interest cannot be adequately represented as a single subgraph. By contrast, the disclosed techniques are more flexible since they allow for user-defined functions of node interest and edge interest. Furthermore, because conventional methods tend to optimize motif conductance only, they do not penalize nodes distant from the seed, which makes it unsuitable for fraud detection. By contrast, the disclosed techniques take into account the distance to the seed node by utilizing a decay function during the expansions.

Although the examples herein chiefly describe applying the techniques in a proprietary graph visualization tool for fraudulent transaction analysis, this is merely exemplary and not intended to be limiting. The graph decomposition techniques can be applied to graphs/networks visualizing any type of data in various environments or tools to provide relevant data context.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
one or more processors configured to:
initialize nodes and edges of a data graph for analysis using a computer;
perform message passing between at least a portion of the nodes of the data graph to determine a corresponding measure of interest for each node of at least a portion of the data graph, wherein neighborhood expansion is performed based at least in part on: (i) the measure of interest including an edge interest score and (ii) an expansion interest associated with at least one neighbor of a node, wherein the edge interest score is determined using an edge interest function that is monotonically increasing on the edge interest score;
receive an identification of one or more nodes of interest in the data graph;
perform message passing between at least a portion of the nodes of the data graph using at least the determined measures of interest to identify a corresponding subgraph of interest for each of the one or more nodes of interest in the data graph;
perform an analysis action using the one or more identified subgraphs of interest; and
a memory coupled to at least one of the one or more processors and configured to provide the one or more processors with instructions.

2. The system of claim 1, wherein the one or more processors are configured to initialize nodes and edges of the data graph including by being configured to:
determine a node interest score for an associated node using a node interest function; or
determine the edge interest score for an associated edge using an edge interest function.

3. The system of claim 2, wherein at least one of the node interest function and the edge interest function is user-defined.

4. The system of claim 2, wherein at least one of the node interest score and the edge interest score determines a likelihood of expanding to a corresponding node.

5. The system of claim 1, wherein the one or more processors are configured to perform message passing between at least the portion of the nodes of the data graph to determine the corresponding measure of interest for each node of at least the portion of the data graph including by being configured to:
send, for each node, at least one message to node neighbors through corresponding edges;
update, for each node, a pool of received one or more messages; and
update, for each node, the corresponding measure of interest based at least in part on the pool of received one or more messages.

6. The system of claim 5, wherein the one or more processors are configured to update the corresponding measure of interest based at least in part on a user-defined interest function.

7. The system of claim 5, wherein the one or more processors are configured to perform message passing between at least the portion of the nodes of the data graph to determine the corresponding measure of interest for each node of at least the portion of the data graph repeatedly until a stopping condition is met.

8. The system of claim 1, wherein the one or more processors is configured to perform at least partly in parallel the message passing between at least a portion of the nodes of the data graph to determine a corresponding measure of interest for each node of at least a portion of the data graph.

9. The system of claim 1, wherein the one or more processors are configured to:
to initialize nodes and edges of the data graph including by being configured to determine a node interest score for an associated node using a node interest function; and
perform message passing between at least the portion of the nodes of the data graph to determine the corresponding measure of interest for each node of at least the portion of the data graph including by being configured to update the node interest score using the determined measure of interest.

10. The system of claim 1, wherein the one or more processors are configured to receive the identification of one or more nodes of interest in the data graph including by being configured to receive a user selection of a seed node via a user interface.

11. The system of claim 1, wherein the one or more processors are configured to perform message passing between at least the portion of the nodes of the data graph using at least the determined measures of interest to identify the corresponding subgraph of interest for each of the one or more nodes of interest in the data graph including by being configured to:
define a minimum interest for the identified one or more nodes of interest in the data graph; and
send a corresponding message to node neighbors of the identified one or more nodes of interest through corresponding edges.

12. The system of claim 11, wherein the one or more processors are configured to perform message passing between at least the portion of the nodes of the data graph using at least the determined measures of interest to identify the corresponding subgraph of interest for each of the one or more nodes of interest in the data graph including by being configured to:
calculate the expansion interest for each neighbor of each of the one or more nodes of interest using the corresponding message; and
in response to the expansion interest for a respective neighbor exceeding a minimum interest of a respective node of interest, update message information for the corresponding message.

13. The system of claim 12, wherein the one or more processors are configured to perform message passing between at least the portion of the nodes of the data graph using at least the determined measures of interest to identify the corresponding subgraph of interest for each of the one or more nodes of interest in the data graph including by being configured to, after updating the message information for the corresponding message:
identify a second set of one or more nodes of interest in response to a stopping condition being unmet; and
send the corresponding message to node neighbors of the identified second set one or more nodes of interest through corresponding edges.

14. The system of claim 12, wherein the expansion interest for each neighbor of each of the one or more nodes of interest is calculated based at least in part on a measure of interest of a respective neighbor scaled by a decay function.

15. The system of claim 11, wherein the one or more processors are configured to perform message passing between at least the portion of the nodes of the data graph using at least the determined measures of interest to identify the corresponding subgraph of interest for each of the one or more nodes of interest in the data graph repeatedly until a stopping condition is met.

16. The system of claim 1, wherein the one or more processors are configured to perform at least partly in parallel message passing between at least a portion of the nodes of the data graph using at least the determined measures of interest to identify a corresponding subgraph of interest for each of the one or more nodes of interest in the data graph.

17. The system of claim 1, wherein the one or more processors are configured to identify the corresponding subgraph of interest for each of the one or more nodes of interest in the data graph including by being configured to apply a map-reduce operation to expansions associated with the one or more nodes of interest.

18. The system of claim 1, wherein the one or more processors are configured to initialize nodes and edges of the data graph including by being configured to:
determine a node interest score for an associated node using a node interest function; and
the node interest score is based at least in part on at least one of: a type of a node, a past label of a node, a volume of activity associated with a node, or a topological feature of a node.

19. The system of claim 1, the one or more processors are configured to initialize nodes and edges of the data graph including by being configured to:
determine the edge interest score for an associated edge using an edge interest function; and
the edge interest score is based at least in part on at least one of: past label of an edge, a weight of an edge, a volume of activity associated with an edge, or a relationship of an edge to a corresponding node.

20. A method, comprising:
initializing nodes and edges of a data graph for analysis using a computer;
performing message passing between at least a portion of the nodes of the data graph to determine a corresponding measure of interest for each node of at least a portion of the data graph, wherein neighborhood expansion is performed based at least in part on: (i) the measure of interest including an edge interest score and (ii) an expansion interest associated with at least one neighbor of a node, wherein the edge interest score is determined using an edge interest function that is monotonically increasing on the edge interest score;
receiving an identification of one or more nodes of interest in the data graph;
performing message passing between at least a portion of the nodes of the data graph using at least the determined measures of interest to identify a corresponding subgraph of interest for each of the one or more nodes of interest in the data graph; and
performing an analysis action using the one or more identified subgraphs of interest.

21. A computer program product embodied in a non-transitory computer readable medium and comprising computer instructions for:
initializing nodes and edges of a data graph for analysis using a computer;
performing message passing between at least a portion of the nodes of the data graph to determine a corresponding measure of interest for each node of at least a portion of the data graph, wherein neighborhood expansion is performed based at least in part on: (i) the measure of interest including an edge interest score and (ii) an expansion interest associated with at least one neighbor of a node, wherein the edge interest score is determined using an edge interest function that is monotonically increasing on the edge interest score;
receiving an identification of one or more nodes of interest in the data graph;
performing message passing between at least a portion of the nodes of the data graph using at least the determined measures of interest to identify a corresponding subgraph of interest for each of the one or more nodes of interest in the data graph; and performing an analysis action using the one or more identified subgraphs of interest.

* * * * *

UNITED STATES PATENT AND TRADEMARK OFFICE
CERTIFICATE OF CORRECTION

PATENT NO. : 11,636,487 B2
APPLICATION NO. : 17/070814
DATED : April 25, 2023
INVENTOR(S) : Maria Inês Silva et al.

Page 1 of 1

It is certified that error appears in the above-identified patent and that said Letters Patent is hereby corrected as shown below:

On the Title Page

Item (73), assignee, address, after "Feedzai-Consultadoria e Inovação Tecnológica, S.A.", insert --(PT)--.

Column 2, item (56), other publications, cite no. 1, after "Pagerank", insert --.--.

In the Drawings

In sheet(s) 1 of 13, figure 1, block 104, after "between at", delete "a".

In the Specification

In Column 10, Line(s) 58, delete "$\theta_2(L)=e^{1-51\,L|}$" and insert --$\theta_2(L)=e^{1-|L|}$--, therefor.

In Column 12, Line(s) 31, before "neighbors", insert --to--.

Signed and Sealed this
Twenty-fourth Day of October, 2023

Katherine Kelly Vidal
*Director of the United States Patent and Trademark Office*